Aug. 11, 1931.  L. C. MILBURN  1,818,417

LANDING GEAR

Filed Nov. 5, 1927

INVENTOR
Lessiter C. Milburn
BY
Kwis, Hudson & Kent
ATTORNEYS

Patented Aug. 11, 1931

1,818,417

UNITED STATES PATENT OFFICE

LESSITER C. MILBURN, OF WICKLIFFE, OHIO, ASSIGNOR TO THE GLENN L. MARTIN COMPANY, OF CLEVELAND, OHIO, A CORPORATION OF OHIO

LANDING GEAR

Application filed November 5, 1927. Serial No. 231,263.

This invention relates to improvements in airplanes and has reference particularly to the landing gear thereof.

It is desirable in many cases to have the space beneath the fuselage of an airplane, or at any rate the central part of that space, clear of obstruction for carrying packages, bombs or other articles. In order to accomplish this purpose it is necessary to have the forward landing gear either arched upwardly at the center or constructed in separate units, one on each side of the center line of the plane.

One of the objects of the present invention is the construction of the forward landing gear in two units so designed as to possess maximum strength with minimum weight.

Another object is the provision of a landing gear of this type in which the planes of the ground wheels are maintained parallel with the principal longitudinal axis of the machine.

Still another object is the provision of a landing gear so constructed as to easily absorb any braking torque which may be applied to the ground wheels.

Other objects and features of novelty will appear as I proceed with the description of that embodiment of the invention which, for the purposes of the present application, I have illustrated in the accompanying drawings, in which—

Figure 1:
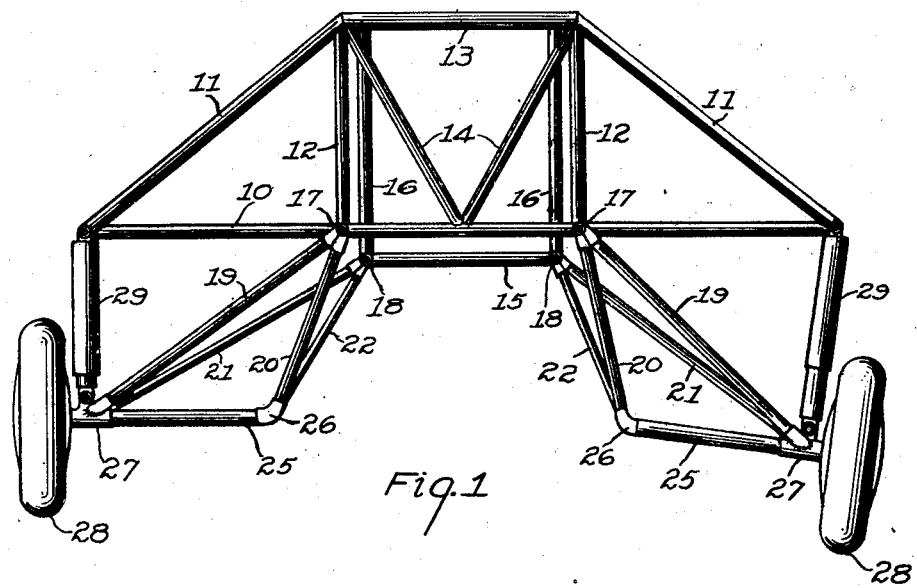
Figure 2:
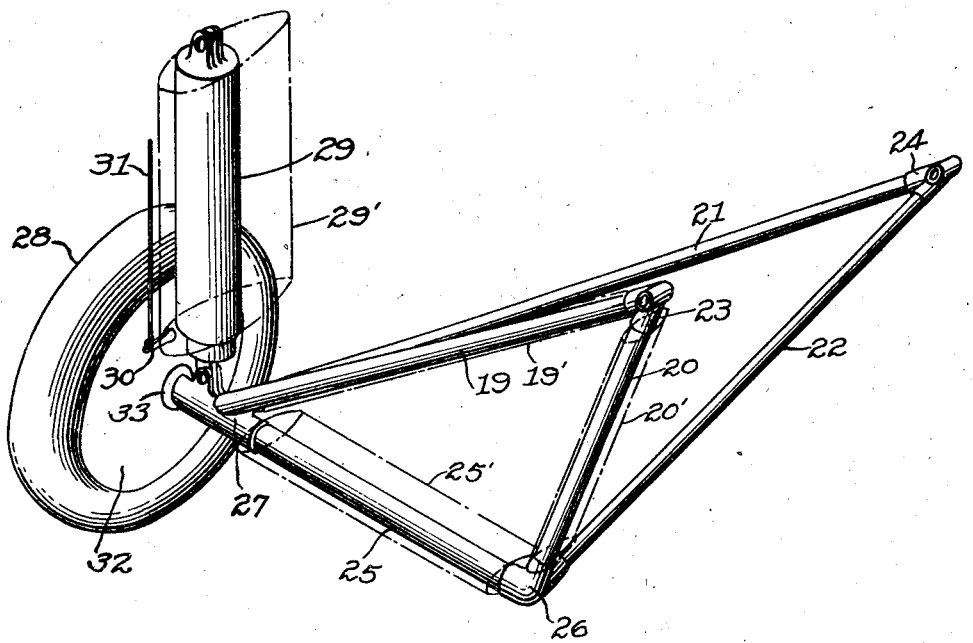

Fig. 1 is front view somewhat in perspective of a portion of an airplane frame with my landing gear applied thereto; and Fig. 2 is a perspective view of one unit of the landing gear shown in Fig. 1.

In Fig. 1 portions of the framework of an airplane are illustrated, comprising a relatively long bar 10 positioned transversely of the plane near the floor of the fuselage and inclined braces 11 extending inwardly from the ends of bar 10 to the fuselage near the top thereof. Uprights 12, an upper cord member 13 and inclined struts 14 serve to complete an arch, whereby the bar 10 is greatly reinforced. Behind the plane of this arch and preferably comprising a portion of the framework of the airplane is a short transverse bar 15. Uprights 16 are shown connected with the bar 15, but the other elements for reinforcing the latter bar are omitted from the drawing for the sake of clearness. The bars 10 and 15 are parallel, are spaced apart a considerable distance and are held against movement towards or away from each other by suitable bracing means, not shown. Bars 10, 11, 12, 19, and 20 are located in a plane common to each other and bars 16 are longitudinally located in relation to bars 12.

At the intersections of bar 10 with uprights 12 there are pivot points 17. Similar pivot points 18 are located at the intersections of bar 15 with uprights 16. At the pivot points 17 and 18, on each side of the fuselage, I hinge an axle carrier comprising rods or tubes 19 and 20 meeting at the pivot point 17 and rods or tubes 21 and 22 meeting at the point 18. The tubes 19 and 20 are rigidly joined at their upper ends by a union 23 and the tubes 21 and 22 by a similar union 24. These unions may carry the necessary hinge elements, as shown in Fig. 2. An axle 25 is rigidly supported at its inner end upon the tubes 20 and 22 by a union 26, and near its outer end it is supported upon tubes 19 and 21 by a union 27. The axle 25, with its carrier tubes and with that part of the frame work which holds pivot points 17 and 18 in fixed relation, constitutes a tetrahedron, all edges of which are fixed and rigid with respect to each other. The pneumatic landing wheels 28 are journaled upon the outer ends of axles 25, in the conventional manner.

The outer ends of the landing gear units, swing in arcs about the lines through pivots 17 and 18 and are connected to the airplane structure by a member 29. Member 29 may be a plain strut, or what is known as an oleo strut. As is well known in the art, an oleo strut is constructed so as to take shocks upon air and rebounds upon oil but a plain strut is sufficient with low air pressure in the tires on the landing wheels. Strut 29 is mounted in a perpendicular plane common to axle 25 and bars 10 and 11.

Each of the wheels 28 is provided with a suitable brake, details not shown, adapted to be operated by a lever 30 pivotally attached to plate 32 attached at 33 to axle member 27, and a control rod or cable 31. In order to minimize air resistance, the various parts of the units may be covered with stream-line metal shells, some of which are indicated by dot and dash lines at 19′, 20′, 25′ and 29′ in Fig. 2.

The considerable separation of the pivot points 17 and 18, the perpendicular relation of bars 19 and 20 to the airplane structure, and the rigidity of the tetrahedron unit insures maintaining the wheels 28 in their proper straight ahead positions at all times. These same features of the construction also serve adequately to prevent turning of the axle 25 when the brakes are applied to the wheels, in other words, the structure is well fitted to absorb braking torque.

Having thus described my invention, what I claim is:

1. In combination with the structure of an airplane, an axle, a ground wheel mounted on one end thereof, an axle carrier rigidly connected with the axle and hinged to said framework at separated points positioned on a line extending longitudinally of the plane, said carrier together with the axle and the line of the hinge forming a tetrahedron the forward triangular portion of which lies in a plane perpendicular to said structure, whereby the axle is laterally and perpendicularly braced at both ends, and means connecting said axle adjacent the wheel with said structure.

2. In combination with the structure of an airplane, an axle; a landing wheel mounted on one end of said axle; an axle carrier comprising two members rigidly attached to each other and to said axle forming a triangular frame, said frame laterally hinged to the forward portion of said structure and maintained to a plane perpendicular to said structure by a second triangular frame comprising two members rigidly attached to each other and to said axle, said second frame rearwardly hinged in lateral relation to said structure and in longitudinal relation to said forward hinge; and a perpendicularly disposed member connecting said axle with said structure.

3. In combination with the structure of an airplane, an axle; a landing wheel mounted on one end of said axle; an axle carrier comprising two members rigidly attached to each other and to said axle forming a triangular frame, said frame laterally hinged to the forward portion of said structure and maintained to a plane perpendicular to said structure by a second triangular frame comprising two members rigidly attached to each other and to said axle, said second frame rearwardly hinged in lateral relation to said structure and in longitudinal relation to said forward hinge; and a perpendicularly disposed resilient member hingedly connecting said axle with said structure.

4. In an airplane structure, a landing gear comprising a pair of oppositely arranged wheel and axle units as specified in claim 2 laterally attached to said structure in a manner to provide an unencumbered space therebetween at the middle of the airplane.

In testimony whereof, I hereunto affix my signature.

LESSITER C. MILBURN.